US008615924B2

(12) United States Patent
Dinihanian, Jr.

(10) Patent No.: US 8,615,924 B2
(45) Date of Patent: Dec. 31, 2013

(54) ENHANCED-STABILITY COLLAPSIBLE A-FRAME PLANT SUPPORT WITH REMOVABLE GREENHOUSE COVER

(76) Inventor: Vahan M. Dinihanian, Jr., Portland, OR (US)

( * ) Notice: Subject to any disclaimer, the term of this patent is extended or adjusted under 35 U.S.C. 154(b) by 570 days.

(21) Appl. No.: 12/786,348

(22) Filed: May 24, 2010

(65) Prior Publication Data

US 2011/0283610 A1 Nov. 24, 2011

(51) Int. Cl.
*A01G 17/06* (2006.01)
*A01G 17/14* (2006.01)

(52) U.S. Cl.
USPC ....... 47/45; 47/44; 47/47; 211/198; 248/27.8; 248/460

(58) Field of Classification Search
USPC ............. 47/45, 44, 47, 70, 29.5, 29.6, 20.1, 47/29.1; 211/198, 195, 200, 21, 181.1; 248/175, 27.8, 153, 150, 166, 168, 248/440, 188, 460; 182/152, 165, 175, 25
IPC ............................................... A01G 13/04,9/16
See application file for complete search history.

(56) References Cited

U.S. PATENT DOCUMENTS

| | | | | |
|---|---|---|---|---|
| 93,551 A | * | 8/1869 | Oakley | 211/198 |
| 352,824 A | * | 11/1886 | Nicholson | 190/14 |
| 362,225 A | * | 5/1887 | Norris | 47/44 |
| 415,638 A | * | 11/1889 | Hawks | 47/20.1 |
| 680,507 A | * | 8/1901 | Thomas | 47/44 |
| 760,879 A | | 5/1904 | Kunzman | |
| 775,683 A | * | 11/1904 | Seelhorst | 47/44 |
| 918,553 A | * | 4/1909 | Hoppe | 182/22 |
| 1,907,817 A | * | 5/1933 | Hubbell, Jr. | 439/112 |
| 1,907,918 A | * | 5/1933 | White | 248/27.8 |
| 1,919,824 A | * | 7/1933 | Bruning | 248/27.8 |
| 2,014,175 A | | 9/1935 | Hart | |
| 2,051,596 A | | 8/1936 | Harbaugh | |
| 3,397,485 A | | 8/1968 | Peterson | |
| 4,019,280 A | | 4/1977 | Summers | |
| 5,048,231 A | | 9/1991 | Brown | |
| 5,179,799 A | | 1/1993 | Hillestad | |

(Continued)

OTHER PUBLICATIONS

Author: John "Woody" Woodzick; Title of the Article: Woody's Folding Tomato Cages; Title of the Item: http://www.motherearthnews.com/Organic-Gardening/2005-02-01/DIY-Tomato-Cages.aspx; Date: Feb. 1, 2005; p. 1 (copy attached for convenience); Publisher: www.motherearthnews.com; City and/or country: World Wide—Internet.

(Continued)

*Primary Examiner* — Andrea Valenti
(74) *Attorney, Agent, or Firm* — Howard Russell

(57) ABSTRACT

An enhanced-stability, A-frame-shaped plant support for the support of plants such as tomato vines, or other fruits and vegetables growing in soil which, while supporting plants laden with heavy fruits or vegetables, is stable and greenhouse tent wind-sail resistant, in part because of a readily usable starting width gauge indicator on detent latch members operable to controlling the ultimate width between pivotable opposing halves of the plant support during installation to a desired depth in the soil. After use, when removed from the soil, the A-frame-shaped plant support collapses, pivoting about preferably hog-ring type interconnection rings between the opposing halves of the plant support for facilitating easy removal from the ground and folding flat for easy storage.

9 Claims, 9 Drawing Sheets

(56) References Cited

U.S. PATENT DOCUMENTS

| | | | | |
|---|---|---|---|---|
| 5,287,946 | A | * | 2/1994 | Mayo ............................ 182/165 |
| 5,412,905 | A | | 5/1995 | Allison |
| 5,423,148 | A | | 6/1995 | Thornhill |
| 5,507,399 | A | * | 4/1996 | Hermanson ................. 211/181.1 |
| 6,006,469 | A | * | 12/1999 | DeMatties ..................... 47/23.2 |
| 6,088,956 | A | | 7/2000 | Rocka |
| 7,281,352 | B2 | | 10/2007 | Peck |

OTHER PUBLICATIONS

Author: Texas Tomato Cages; Title of the Article: Texas Tomato Cages; Title of the Item: http://tomatocage.com/; Date: at least as early as Nov. 10, 2009; p. 1 (copy attached for convenience); Publisher: http://tomatocage.com/; City and/ or country: World Wide—Internet.

* cited by examiner

ENHANCED-STABILITY COLLAPSIBLE A-FRAME PLANT SUPPORT WITH REMOVABLE GREENHOUSE COVER

BACKGROUND OF THE INVENTION

The present invention relates in general to a stable yet collapsible plant support with removable portable protective cover for use in a private garden or commercial farming operation and in particular to a collapsible A-frame-shaped plant support with a removable protective cover and that is readily installed, stabilized and removed after use for effectively supporting and protecting tomato and other fruit and vegetable plants.

According to Woodstock Wire Works, Inc. of Vernon, Calif., there were, in the late 1990's, more than an estimated 100 million tomato/plant support cages used in approximately 30 million vegetable gardens in the United States. Annually, approximately 40 million more tomato/plant support cages have been fabricated and sold worldwide. The USDA has reported that the U.S. fresh-market field-grown tomato production for 2007 has been over 3.7 billion pounds with a value of greater than $1.27 billion.

There have been a number and variety of plant support structures, including and without limitation round cages, vertical trellises, espaliers, and A-frame supports. These support structures have been used in both home gardens and commercial growing operations to support the sometimes heavy burden of large fruit and vegetables produced on the plants to have been supported by the plant support structure. Where such structures have been made with inferior designs or weak materials, they have buckled under the weight of the fruit, they have been difficult to install, they have broken upon installation and removal, and they have been blown over in windy conditions.

Further, where early planting dates have been critical and inclement weather has been more common, some of these support structures have doubled as support for a portable, removable, cold-frame type greenhouse protective covering as well. Without this protection, crops that have been planted before the last winter freeze has occurred may have been damaged or destroyed by frost damage, which has resulted in damage to the produce and a financial loss to the grower. These cold-frame type greenhouse protective coverings have exacerbated the instability of poorly designed or weak structures, since the protective covering has acted as a wind sail to catch the wind to add increased force to an already over-burdened structure.

U.S. Pat. No. 5,412,905 to Allison, teaches a Tomato Green House plant support structure that has employed an inverted cone shape with cross support members and spike-type legs at the bottom which have been driven into the ground to hold the structure upright. Being an inverted cone shape, increased weight of fruit on the vines running over the ladder-like support bars near the top of the structure, together with wind forces, have caused the structure to be unstable and to topple during adverse conditions. The addition of a protective cold-frame greenhouse type cover to such a structure has added to its instability. A further disadvantage of this type of plant support has been that it has not been collapsible for easy folding and storage.

In practice, such prior art devices, have often been made of small gauge wire and have been constructed with ineffective spot welds. Further, insufficient design consideration has been given to the angle of insertion of the leg extensions of such devices such that undue stress has been placed on the legs as the they have been inserted into the ground. Through repeated use, this stress has caused weakening of the smaller gauge materials comprising the legs of the structure which has led to their premature failure. Owing to the small gauge of the wire construction of such devices, they have been difficult to install and remove, and upon pushing on them to install them, or upon pulling on them to remove them from the ground, they have bent or broken and have at best become useless for further use. Those familiar with gardening can readily attest to the difficulty of removal of lesser quality structures from the ground, there not being sufficient handle to pull on to remove the device, and there not having been provided in the prior art means for facilitating easier removal. This problem has been addressed by the use of smaller gauge wiring which will not have to cut through hardened ground upon removal, but as mentioned previously, this solution has the unfortunate consequence of lesser support for the plant and lesser resistance to bending and breakage of the device upon attempted installation and removal.

Other prior art plant support devices recognizing the virtue of flat storage of a plant support device, for example during winter months, have provided for collapsible or foldable plant support structures. A variety of such devices can be found, such as a Collapsible Plant Support of U.S. Pat. No. 4,019,280 to Summers. The Summers device discloses a generally tripod shaped device employing helically-wound wire springs attachable end-to-end to provide a structure for preventing undue spreading of the base of the structure upon installation in the ground. Upon removal of the wire springs, the device collapses for storage. The Summers device provides no gauging means to facilitate easy installation of an A-frame device without over-tensioning the legs of the device. Further, no foot pegs are provided for facilitating the installation of the device in the soil.

A Foldable Plant Support Structure and System of U.S. Pat. No. 6,088,956 to Rocka provides a cylindrical plant support structure that is collapsible to a flat structure for storage. No foot pegs are disclosed for readily installing the device in the ground, and the leg spikes to be driven into the ground are perpendicular to the ground such that no tension is introduced into the frame of the structure upon installation, making it less stable during adverse weather, excess loading or bumping of the device. Further, the Rocka device is subject to instability as uneven loads are added to the device, and this is exacerbated by a lack of static downwardly directed force component on the legs below the surface of the ground for the ground to hold onto the device to counteract such uneven loading. Finally, no gauging system for readily and easily installing the device to the correct depth in the ground is provided.

In U.S. Pat. No. 5,179,799, to Hillestad, a Demountable Tomato Plant Support is disclosed which embodies a plurality of tiers of vertically spaced ring members removably engaging metal rods that are inserted in the ground to stabilize the support. Since the basic shape of the Hillestad device is an inverted cone shape, increased weight of fruit on the vines running over the upper circular ring members near the top of the structure, together with wind forces, have caused the structure to be unstable and to topple during excessive loading and adverse conditions. The addition of a protective cold-frame greenhouse type cover to such a structure has added to its instability for the wind sail effect created as described above.

Other storable plant support devices have been known in the art, including Collapsible Plant Stand of U.S. Pat. No. 7,281,352 to Peck, a Plant Support Constructed for Compact Nesting of U.S. Pat. No. 5,048,231 to Brown, and a Plant Support of U.S. Pat. No. 760,879 to Kunzman. None of these devices has disclosed an enhanced-stability, A-frame structure with means for readily installing to a correct depth and at an optimized tension to maximize stability and appropriate positioning. Accordingly, these devices, in some cases inverted in cone shape, or at best a cylindrical shaped structure with vertically installable legs, have not been designed to provide greater stability as plant loads, adverse weather conditions or other upsetting factors have effected stability.

To the degree the leg extensions of such support structures have been installed perpendicularly to the ground, with the leg extension puncturing the ground without slicing the ground during installation, the legs and depending structures have relied for stability upon the forces of gravity and of friction between the soil, which is variable depending upon the makeup of the soil, and the relatively smooth surface of the leg extensions. This has made the plant support structure vulnerable and subject to lifting out of the ground in the event that an upward force, such as an upward component of a wind force greater than the forces of gravity and friction acting upon the legs of the cold-frame or plant support structure, have been applied. And while increased loads from fruit bearing plants have tended to counteract such upwardly directed vertical force components, it is well-understood that such forces only rarely exist exclusively as vertically upward component forces. Rather, wind forces most often have force components also acting horizontal to the ground, further lending to the inherent instability of devices that extend vertically from supporting legs that are installed into the soil perpendicular to the ground and without sufficient opposing horizontal force components within the structure. This also become a factor for plant stands that do not have a base that is wider than the top of the stand, since such are more vulnerable to wind or bumping forces that would tend to topple the stand.

One prior art plant structure and greenhouse, a Reversible Plant Cage/Greenhouse disclosed in U.S. Pat. No. 5,423,148 to Thornhill, combines a plant cage and a portable greenhouse in a single device. Inverted, the device provides a plant supporting structure, and upright the device provides a greenhouse type structure having spikes that stick into the ground. In the plant supporting configuration of the Thornhill device, the plant support of the device is in the form of an inverted cone and thus is not stabile, similar to the device of Allison described above. Thus, as the weight of fruit, adverse weather conditions and bumping from tools, equipment or persons increases, the design of both Thornhill and Allison have tended to fail to accommodate the forces applied and the devices have toppled. Further, the device of Thornhill is not collapsible to allow for easy storage of the device.

Other prior art plant structures are disclosed that are collapsible and foldable. One of these include the A-frame plant support structure known as Woody's Folding Tomato Cages. These tomato cages are made of rigid wood members, have not been pre-fabricated and have not taught the concept of embedding or otherwise installing the legs of the cage into the soil in such a way as to readily tension semi-rigid and noticeably flexible A-frame members. Further these A-frame plant support structures have not included means for readily installing legs on the device into the soil to enhance stability. As such, the user has simply set these prior art A-frame structures on the surface of the ground creating a less stabile structure in the event of winds, unevenly growing plant loading and/or bumping by other objects.

Rigid A-frame plant support structures would also have had another inherent disadvantage in the angled placement of the legs, in that if it had been attempted to insert the legs into the ground while the legs had been rigidly fixed in relation to each other, as taught in the case Woody's Folding Tomato Cages, the path through which the legs would have traveled into the ground would have remained open, as though having been sliced, and thus the ground would have provided a lesser amount of resistance, relying primarily on friction forces and gravity, to hold the legs of the plant support structure into the ground.

A foot peg, or step, used in conjunction with and to stabilize a plant support has been disclosed in the Plant Stake of U.S. Pat. No. 3,397,485 to Peterson, where a bend in the stake is shown providing a place for a user to step in order to drive the stake into the ground and provide stabilizing forces for the stake while installed. Of course, the Peterson device does not disclose the use of an otherwise stabile structure having a plurality of stabilizing legs and corresponding means for readily installing such plurality of legs into the ground to form a stabilized structure for readily supporting a growing plant.

One prior art cold-frame plant protection device, such as that shown in U.S. Pat. No. 2,014,175 to Hart for a Plant Protector, has employed a portable, cold frame, greenhouse, and has employed leg extensions at the base of the cold frame to serve as pegs or spikes that have been driven into the ground to provide an anchor for the stability of the frame. In this case, the cold-frame type greenhouse has created a wind sail effect that has added to the instability of the frame in moderate to high winds. As a result, the protection device has been pulled out of the ground and blown away, damaging or displacing the supporting cold frame, and this has damaged plants and left them unprotected.

Another example of this type of a cold-frame, greenhouse type device is the Plant Promoting Device of U.S. Pat. No. 2,051,596 to Harbaugh. However, the Harbaugh device has introduced the concept of collapsibility to the structure of the device for flat storage during winter months and also has added s-shaped bends to the spiked legs that have been placed in the soil to allow for the soil to compact around the legs to grip them with downward forces to prevent their untimely lifting out of the ground as with wind forces greater than the forces of gravity and friction acting upon the legs of the cold-frame structure.

Thus, it has been desirable that a sturdy and stability-enhanced plant support structure be devised that is designed to facilitate ease of installation, ease of removal, and provide a standardized structure that easily accommodates a cold-frame type greenhouse protective cover or tent.

SUMMARY OF THE INVENTION

In accordance with a first aspect of the present invention, there is provided an enhanced-stability, A-frame-shaped plant support structure that folds or collapses flat for storage when not in use and that is suitable for use in a garden or farm for the support of plants growing in soil. The support structure comprises first and second block-U-shaped frame members, each block-U-shaped frame member comprising first and second side support frame members, or legs, having first and second ends and an upper interconnecting frame member, cross bar or member, interconnecting the side support frame members at the first end of each side support frame member. In a pre-installation position, the block-U-shaped frame members are inverted with the cross bar or members positioned across an upper portion of the side support frame members or legs.

The support structure further comprises a plurality of cross members, or bars, each cross member interconnecting, as by welding, the side support frame members of each block-U-shaped frame member in ladder-like fashion at a plurality of locations along each side support frame member, preferably in substantially parallel fashion relative to the interconnecting horizontal frame member. The cross member that is closest to the second ends of each side support frame member (nearest the ground immediately prior to installation) preferably comprises an axle as further described below and is sufficiently distant from the second ends of the side support frame members to allow for puncture placement of the second ends of the side support frame members in the soil upon installation.

Means for pivotably joining the interconnecting frame members of each block-U-shaped frame member, preferably hog rings, are provided to enable hinge-like movement of the block-U-shaped frame members relative to each other. The hog ring, or rings, for pivotably joining the frame members preferably comprise an appropriately-sized inside diameter to hold the interconnecting frame members closely adjacent each other but also allowing pivoting movement of the interconnecting frame members relative to each other to allow spreading of the second ends of the side support frame members of the first block-U-shaped frame member relative to the second ends of the side support frame members of the second block-U-shaped frame member. As such, the side support frame members are adapted to form an A-shape support structure upon installation of the second ends of the side support frame members in the soil. Other means of allowing pivotable movement of the A-frame-structure halves relative to each other may be employed by those of ordinary skill in the art without departing from the true scope and spirit of the invention. For example, it is conceivable that means of interlocking the halves through previously known bending techniques that have been adapted to interlocking wire frame members, and which detent the resulting pivotable mechanism from undue spreading, may be applied in accordance with this reference and in a manner known by those of ordinary skill in the art to accomplish the pivotable interconnection of the structure.

Further, there is provided at least one, but preferably two, releasable locking latches being pivotably connected to the first side support frame member of the first block-U-shaped frame member. The latch is operable in a first position to releasably interconnect the first side support member of the second block-U-shaped frame member with the first side support member of the first block-U-shaped frame member.

Where, preferably, the support structure comprises first and second latches, the first latch is pivotably connected to the first side support frame member of the first block-U-shaped frame member and operable to releasably interconnect the first side support member of the second block-U-shaped frame member. The second latch in this case is pivotably connected to one of the second side support frame member of the first block-U-shaped frame member and the second side support frame member of the second block-U-shaped frame member, the second latch being operable to releasably interconnect one of the second side support frame member of the first block-U-shaped frame member and the second side support frame member of the second block-U-shaped frame member. In this case, the first and second latch and U-shaped frame members are adapted for retaining any flex tension upon installation of the support structure in the soil for enhanced stabilization of the support structure.

Further, in a preferred embodiment, the enhanced-stability, A-frame-shaped plant support structure of this first aspect of the invention further comprises stabilizing means that facilitates installation of the plant support structure in the soil along a minimally cutting path into the soil and further preferably facilitates removal of the same from the soil along the same minimally cutting path upon completion of use. Such stabilizing means is preferably operable in a first latched position upon the aforementioned post or axle connected to one or more of the side support frame members of the support structure to resist removal of the plant support from the soil and is further preferably operable to a second unlatched position to facilitate collapse of the structure for easier removal of the plant support from the soil.

The aforementioned stabilizing means preferably comprises a user operable and releasable engagement mechanism on at least one latch of the support structure, the engagement mechanism rigidly interconnecting the latch and the first side support member of the second block-U-shaped frame member in a first installed position wherein the position of the first block-U-shaped frame member and the second block-U-shaped frame members are held in static relation relative to each other by the latch member, the means for pivotably joining the interconnecting members of the block-U-shaped frame members and the second ends of the side support members being adapted for installation in the soil, the engagement mechanism being further user operable to a second position disengaged from the first side support member of the second block-U-shaped frame member to facilitate removal and collapse of the A-frame shaped plant support from the soil without having to cut through the soil.

Preferably each latch comprises first and second ends, wherein the user operable and releasable engagement mechanism further comprises an eyelet on the first end of the latch for pivotably connecting the first end of the latch to the first side support member of the first block-U-shaped frame member, wherein the first side support member of the second block-U-shaped frame member further comprises a latch post rigidly attached thereto, and wherein the engagement mechanism is on the second end of the latch, the engagement mechanism preferably further comprising an inverted, substantially U-shaped hook being user operable to hook the latch post in a first position to rigidly interconnect the first side support member of the first block-U-shaped frame member and the first side support member of the second block-U-shaped frame member, the substantially U-shaped hook being further user operable to unhook the latch post in a second position to facilitate collapse of the A-frame-shaped support structure and facilitate removal of the plant support structure from the ground.

Still further, in accordance with this aspect of the invention, preferably, the cross members closest to the second ends of the side support members each comprise an axle member attached, as by welding, to the side support members, the axle members providing posts adjacent the side support members for retaining the adjacent latch.

Preferably, each latch member comprises an eyelet end and a hooked end, said eyelet end being pivotably retained on one of the posts or axle ends attached to, as by welding, and adjacent the first block-U-shaped frame member by means of an axle hat, and the hooked, or substantially U-shaped end being releasably retained on an opposing post or axle end attached to, as by welding, the second block-U-shaped frame member.

Preferably, the axle members and associated posts are interconnected with said side support members of the first and second inverted, block-U-shaped frame members at locations that are equidistant from the interconnecting horizontal frame members of the inverted, block-U-shaped frame members. Also, preferably, the frame members, cross members, latches and stabilization members of the plant support structure are made of metal rods, such as commonly available green rods, that are greatly resistant to tensile or compressive forces, but which allow some slight flexing to allow creation of tension in the device upon installation in the soil and retained by the latching mechanism, to add to the stability of the structure.

In an alternative embodiment of the invention, there is provided an enhanced-stability, A-frame-shaped plant support structure that folds flat for storage when not in use and that is suitable for use in a garden or farm for the support of plants growing in soil, the support structure comprising a plurality of first and second side support frame members, each side support frame member having first and second ends. A plurality of cross members interconnects the first and second side support frame members at a plurality of locations along each first and second side support frame members to form first and second substantially ladder-like frame structures. Each cross member that is closest to the second ends of the first and second side support frame members is sufficiently distant therefrom such that the second ends of the first and second side support frame members are adapted for puncture placement in the ground upon installation. Means for pivotably joining the first ends of the first side support frame members, and means for pivotably joining the first ends of the second side support frame members to enable end-to-end hinge-like movement of the ladder-like frame structures relative to each other. At least one latch is provided which is pivotably connected to the first side support frame member of the first ladder-like frame structure and is operable to releasably interconnect with the first side support frame member of the second ladder-like frame structure.

In accordance with the alternative embodiment of the invention, the means for pivotably joining the first ends of the first side support frame members and the means for pivotably joining the first ends of the second side support frame members further comprises a plurality of matched eyelets and pins, each eyelet being rigidly connected to one of the first ends of the first and second side support frame members, the eyelets connected to the first side support frame members being aligned with the eyelets connected to the second side support frame members to allow pivotable retention of one of the pins.

The first aspect of the invention provides a very stable plant support structure which increases in stability as increased plant weight is placed upon the device. Unlike several of the prior art devices, where upper branches are supported by a wire frame structure at cantilevered positions laterally further from the center of gravity of the plant support structure as the plant is supported at successively higher plant branches, lending to the inherent instability of such devices, an A-frame-shaped plant support structure in accordance with this first aspect of the invention is structured to increase the stability of the same as the plant grows taller and taller with branches of the plant being supported with cross members that are closer laterally to vertical alignment with the center of gravity of the loaded structure. Thus a structure in accordance with this first aspect of the invention provides a more stable support structure to withstand adverse weather or other stability upsetting conditions, such as being bumped by a gardener or equipment.

Also, a plant support structure in accordance with this first aspect of the invention enhances the stability of the structure by providing an automatic locking mechanism to prevent against undue spreading of the A-frame side support members upon installation and which facilitates easy installation of the structure into the ground, the device legs spreading gradually upon pressure into the soil until the locking mechanism is automatically engaged. Furthermore, the automatic locking mechanism preferably comprises means for preventing unlatching of the mechanism, except when desirable for removal of the device from the ground by user operation.

The automatic latching and detent features of the stabilizing mechanism of this first aspect of the invention enables easier installation of the plant support structure in the ground. This is true since as the pivotable A-frame-shaped halves of the support structure are pushed into the ground and spread apart, they follow a minimally invasive cutting path to arrive at the properly installed depth. Since the latching stability enhancing mechanism is adapted to automatically lock into place until manually released by the user, the device further resists removal from the ground, as by wind forces or bumping, since the soil, having only a minimally cut path therein from the legs having been installed in the ground as mentioned above, further resists removal of the device from the ground as long as the latching stability enhancing mechanism remains locked, until manual release by a user is accomplished as described above. Once the manual release of the stability enhancing latch is made, the device is more easily removed as it is then allowed to collapse during removal to follow the line of the previously cut path in the soil during installation.

In accordance with another aspect of the invention, the aforementioned stabilizing means further preferably comprises width guide measuring means adapted to facilitate the user's establishment of an optimum pre-installation starting position on the surface of the soil with the second ends of the side support frame members resting on the soil just prior to installation of the A-frame-shaped plant support. The stabilizing means and width guide measuring means are preferably adapted to facilitate puncture placement installation of the plant support structure in the soil to the desired depth with minimal cutting of the soil and upon automatic and releasable falling of the latch into place to lock the legs of the side support members in place at the time and location at which the legs are at a predetermined depth in the soil, and hence a predetermined width apart. The width guide measuring means preferably comprises a mark on the latch that is calibrated to account for spreading of the second ends of the block-U-shaped frame members as they travel into the soil during installation of the A-frame-shaped support structure, the at least one latch being adapted for placement at an intermediate position with the latch resting upon the axle, the latch adapted for sliding along the axle during installation until the substantially U-shaped hook becomes engaged with the axle at the final extent of travel of the latch along the axle during pushing of the device legs into the ground during installation. This final extent of travel of the latch along the axle where the U-shaped hook is engaged with the axle corresponds to the optimum depth of puncture of the second ends of the side support members into the soil, for maximum stability and for standardized height for optimum growing and cold-frame type greenhouse tent positioning, the width gauge indicator, the at least one latch and the block-U-shaped frame members being adapted to working together to enable easier installation of the A-frame-shaped support structure by a user pushing the second ends of the side support members into the soil while puncturing to cut a minimal path through the soil to facilitate a tensioned and stabilized installation.

This puncture installation, or placement, capability is preferably facilitated by means of an attachment post, or one of the aforementioned axles, attached on the second block-U-shaped frame member and that the releasably locking latch mechanism engages with to stop the structure from spreading apart at the desired depth of installation. The depth gauge indicator mark on at least one of the latches is adapted for alignment with at least one of the side support frame members of the second block-U-shaped frame member when the latch member rests upon the attachment post or axle end when the structure rests on top of the soil at a pre-insertion position to guide an installer on an appropriate initial pre-installation spread between the second ends of the first and second block-U-shaped frame members prior to installation.

In this manner, the user/installer rests the latch on the post or axle and then the installer can align the mark on the latch with one of the block-U-shaped frame member side support frame members to gauge the appropriate pre-installation spread of the legs of the side support frame members. The mark, such as a notch on the latch, is placed at a predetermined optimum location on the latch where, upon alignment of the mark with a side support frame member, and upon subsequent pressing of the structure in the ground the latch will slide along the axle, or post, and reach its end, the latch automatically falling into place with the U-shaped detent in place, thus signifying the desired depth for the plant support structure.

In accordance with another aspect of the invention, there are preferably provided a plurality of foot pegs, one foot peg being attached, preferably by welding, to each side support member at a location along each side support member that is a distance from the second end of each side support frame member that corresponds to the desired depth of the end of each side support member below the soil upon installation.

The foot pegs of this aspect of the invention further facilitate placement, or installation, of the support structure into sometimes less easily punctured soil, since the user can step on the pegs to help drive the ends of the legs of the structure into the ground. Upon complete installation, the foot pegs rest upon the surface of the ground, further lending to the overall stability of the structure upon installation, since in effect, the foot pegs provide a larger footprint for the support structure on the ground.

In accordance with yet another aspect of the invention, there is a provided a removable A-frame-shaped protective cover of predetermined opaqueness to allow an appropriate amount of light and to create the appropriate degree of weather protection desired, for protecting plants against colder weather conditions.

The removable A-frame-shaped protective cover described in connection with this aspect of the invention is dimensioned so as to be readily applicable to allow a consistent air gap between the protective cover and the soil, the consistent air gap being readily achievable in multiple support structure installations because the starting width gauge indicator enables consistent depth and A-frame-shaped angle properties to be applied to the first and second block-U-shaped members upon installation in the soil.

Preferably, the air gap between the protective cover and the soil is adjustable based upon a plurality of starting width gauge indicator levels on the latch associated with different types of plants and geographic locations having varying cold-weather resistance characteristics. Preferably the protective cover has cut therein an opening to allow ventilation of the cover and also may be able to be folded or rolled up to allow adjustment of the air gap distance of the cover from the ground to accommodate varying temperature and growing conditions.

In yet another aspect of the invention, there is provided a method of installing a collapsible A-frame-shaped plant support structure comprising a plurality of legs and a slidable locking latch further comprising an initial base width indicator marking and a locking engagement mechanism at one end thereof for engaging attachment means, such as a post or axle, depending from, as by welding, at least one of the legs, the latch being adapted for releasably holding the legs of the A-frame-shaped plant support in position relative to each other upon installation in the soil, comprising the steps of: placing the slidable locking latch in slidable engagement relationship with the attachment means; partially opening the leg portions of the A-frame-shaped plant support structure to slide the latch along the attachment means and to a degree corresponding to the initial base width indicator marking on the latch; placing the plant support structure in a desired location with lower portions of the legs resting on the soil; and pressing the plant support structure into the ground causing the latch to slide further along the attachment means until the locking engagement mechanism on the end of the latch releasably locks onto the attachment means at a desired depth of installation of the legs along a precise puncture path into the soil.

In accordance with still another aspect of the invention, a method for facilitated removal of such a collapsible, A-frame-shaped plant support structure from the soil after use, is disclosed comprising the steps of releasing the locking engagement mechanism from the attachment means to enable facilitated removal of the plant support structure from the soil, grabbing a portion of the plant support structure that is above the soil, pulling upwardly on the plant support structure to begin removing it from the soil, the plant support structure collapsing gradually as the legs follow the puncture path created in the soil upon installation and without having to cut a new path in the soil to allow removal of the plant support structure.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DETAILED DESCRIPTION

Figure 1:
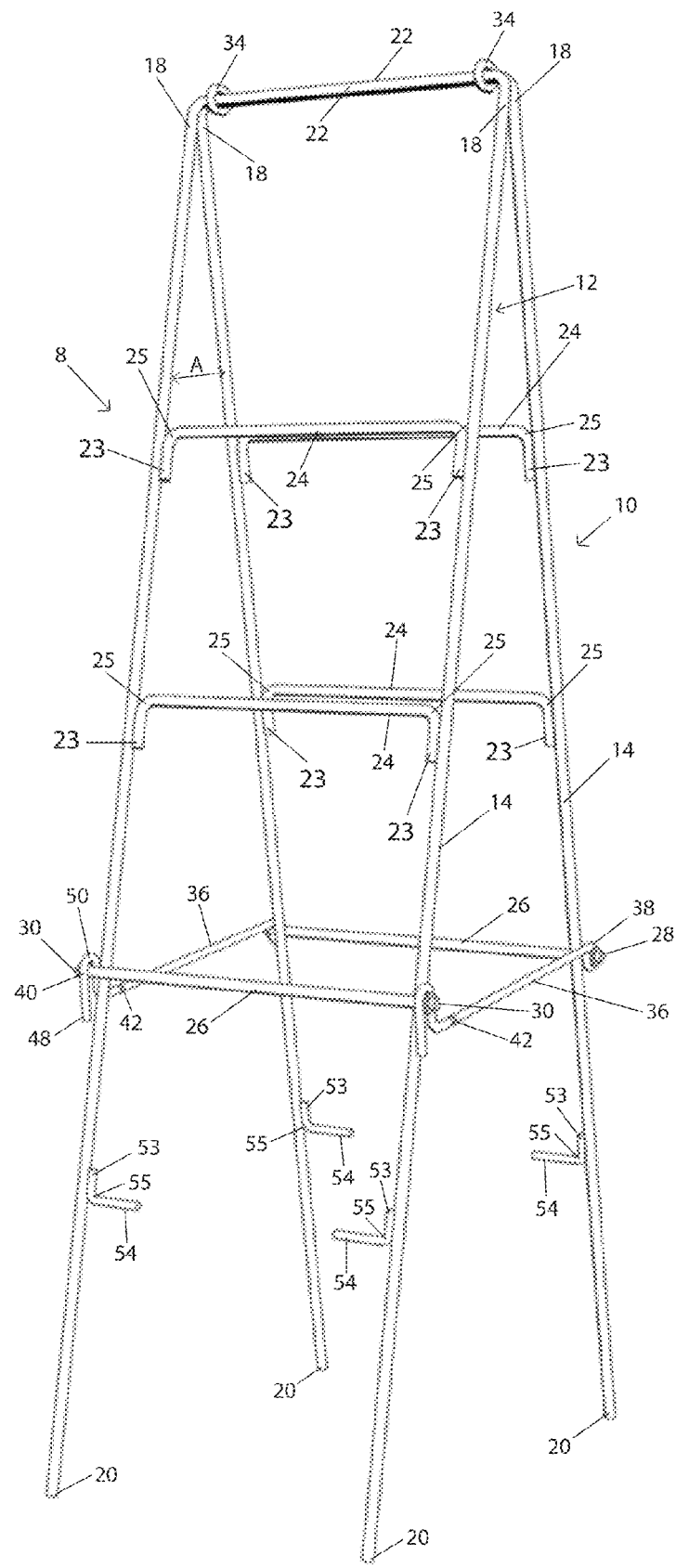
FIG. 1 shows a perspective view of an enhanced-stability, A-frame-shaped plant support structure in accordance with a first embodiment of the invention.
Figure 2:
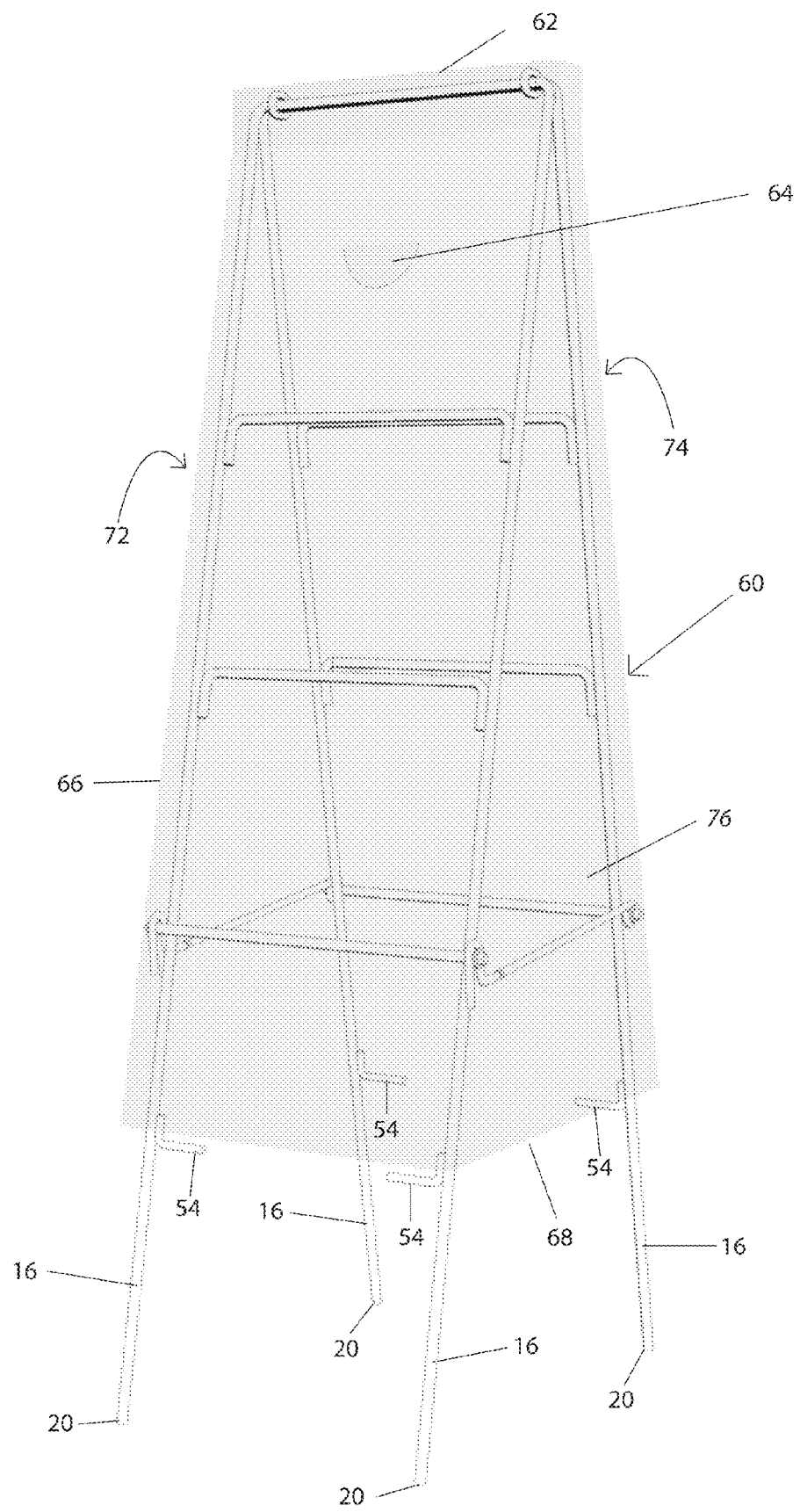
FIG. 2 shows a perspective view of the enhanced-stability, A-frame-shaped plant support structure of FIG. 1 with a removable cold-frame type greenhouse cover.
Figure 8:
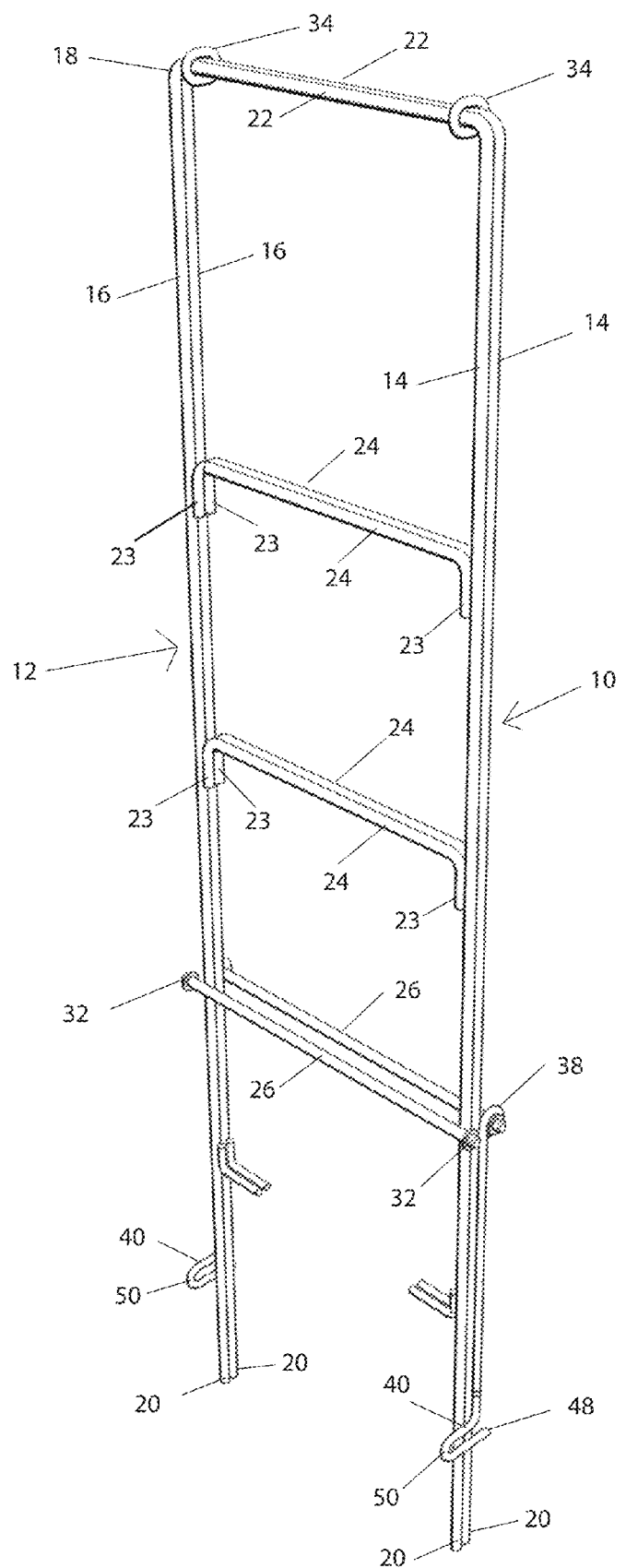
FIG. 8 is a perspective view of a collapsed, enhanced-stability, A-frame-type plant support structure in accordance with the present invention.

Referring to FIGS. 1, 2 and 8, an enhanced-stability, A-frame-shaped plant support structure 8 that folds flat for storage when not in use according to a preferred embodiment of the present invention is disclosed and comprises a pair of inverted, substantially block-U-shaped frame members 10 and 12 that are preferably and approximately 2 feet wide by 4.5 feet high for a home garden or other suitable size for use as a plant support in a commercial setting. Wider support structures may be envisioned for commercial applications, and it will be appreciated by those of ordinary skill in the art that the invention shall not be limited by such relative sizing and dimensions.

Each block-U-shaped frame member 10, 12 is comprised of a first and second side support frame member, each side support frame member having first and second ends 18, 20. Further, each block-U-shaped frame member 10, 12 comprises an interconnecting frame member 22 interconnecting the first and second side support frame members 14, 16 for the block-U-shaped frame members 10, 12 at the first ends 18 of the side support frame members. The second ends 20 of the side support frame members 14, 16 are adapted for puncture placement of the side support members of the structure 8 in the soil, preferably at about a distance of 12 inches depth along the side support frame member and from where the side support frame members are at ground 6 level while fully installed (see FIG. 6c for the fully installed position of the support structure 8).

Each inverted block-U-shaped frame member 10, 12 has preferably welded thereto a plurality of cross members 24, or support bars, which are preferably horizontal and evenly spaced at their points of attachment along the length of the side support frame members 14, 16 to allow for sufficient plant support locations for a plant that grows over time along the structure 8. It is preferable that the cross members 24 be bent 90 degrees as shown at 25 to create a downwardly extending portion 23 of cross member 24 to allow for a greater surface area attachment location for welding on the downwardly extending portion of the cross member and an internal edge of the side support member 14, 16. Attachment as by welding in this fashion between downwardly extending portion 23 of cross member 24 also enhances the ability of the support structure 8 to fold flat for storage and shipping. Further, while two such cross members 24 are shown, it will be appreciated that more or fewer such cross members may be employed without departing from the true scope and spirit of the invention.

A lowermost cross member 26 is preferably not bent like the other cross members 24, but rather serves as an axle 26 for each block-U-shaped frame member 10, 12. Each axle 26 is welded to the first and second side support frame members 14, 16 of block-U-shaped frame members 10, 12 with an end portion of each axle extending to form a pivot post 28 and a latch post or releasable engagement member 30, each such post or member extending preferably beyond each side support frame member. As more clearly shown in FIGS. 5c and 5d, in a preferred embodiment of the invention, an axle hat 32 is placed in force fit relation on each end of each of the axles 26. Thus, preferably each post 28, 30 extends beyond each side support member a sufficient length to retain the width of the latch and the retaining member axle hat as described.

At least one hog ring 34, but preferably a plurality of hog rings 34, are used for pivotably joining the interconnecting frame members 22 of each block-U-shaped frame member 10, 12. The hog rings 34 are of sufficiently small inner diameter to hold the interconnecting frame members 22 in close, even touching, relation along their lengths. However, the hog rings 34 are also of sufficiently large diameter to allow the interconnecting frame members to pivot or roll relative to each other, such that the side support frame members 14, 16 of each block-U-shaped frame member 10, 12 are allowed to expand outwardly during installation from each other to increasingly form an acute inner angle A as shown in FIGS. 1, 5a and 6a-c.

As will be appreciated by those of ordinary skill in the art, other means of similarly pivotably joining the interconnecting frame members 22 of each block-U-shaped frame member 10, 12 may be employed. For example, tie wraps, zip ties, ultraviolet stabilized tape, injection molded clips or other means for holding the frame members in similarly close and fixed proximity relative to each other, while still allowing them to pivot relative to each other, may be used without departing from the true spirit and scope of the invention as set forth in the claims appended hereto.

Further, alternatively, other means for pivotably joining a pair of first and second side support frame members 14', 16' themselves may be employed such as with matched eyelets 21 at upper first ends 18' of each first and second side support frame member, the eyelets being interconnected with pins, nut and bolts, or rivets 19, preferably with the use of washers 17, to allow pivoting of the now more ladder-like frame members 10', 12' held in an otherwise partially fixed relationship as described previously. To accomplish this means of joining, the ladder-like frame members 10', 12' may be offset, or preferably contain a bend near the first ends of one of the first and second side support frame member 14', 16' pairs to allow alignment of the eyelets 21 as shown without negatively impacting the operation of latch mechanisms 36. The remainder of this alternative embodiment of the invention is in conformity with the preferred embodiment of the invention.

During removal of the support structure 8 from the ground 6, the acute angle A decreases gradually until the support structure is fully collapsed in which side support members 14, 16 are closely adjacent corresponding side support members 14, 16. Thus, during a collapsed state for storage of the support structure 8, side support frame member 14 of block-U-shaped frame member 10 is positioned closely adjacent and parallel to side support frame member 14 of block-U-shaped frame member 12, and side support frame member 16 of block-U-shaped frame member 10 is positioned closely adjacent and parallel to side support frame member 16 of block-U-shaped frame member 12.

Preferably, latch mechanisms 36 comprise an eyelet 38 at one end thereof and an inverted, substantially U-shaped detent latch mechanism 40 at the other end thereof. Eyelet 38 of each latch mechanism is carried on post or end 28 of axle 26 and is retained from falling off of post 28 by means of an axle hat 32. It will be appreciated by those of ordinary skill in the art that other means of achieving varying degrees of releasable attachment mechanism 40 may be employed with varying degrees of desirability for differing embodiments.

Figure 5A:
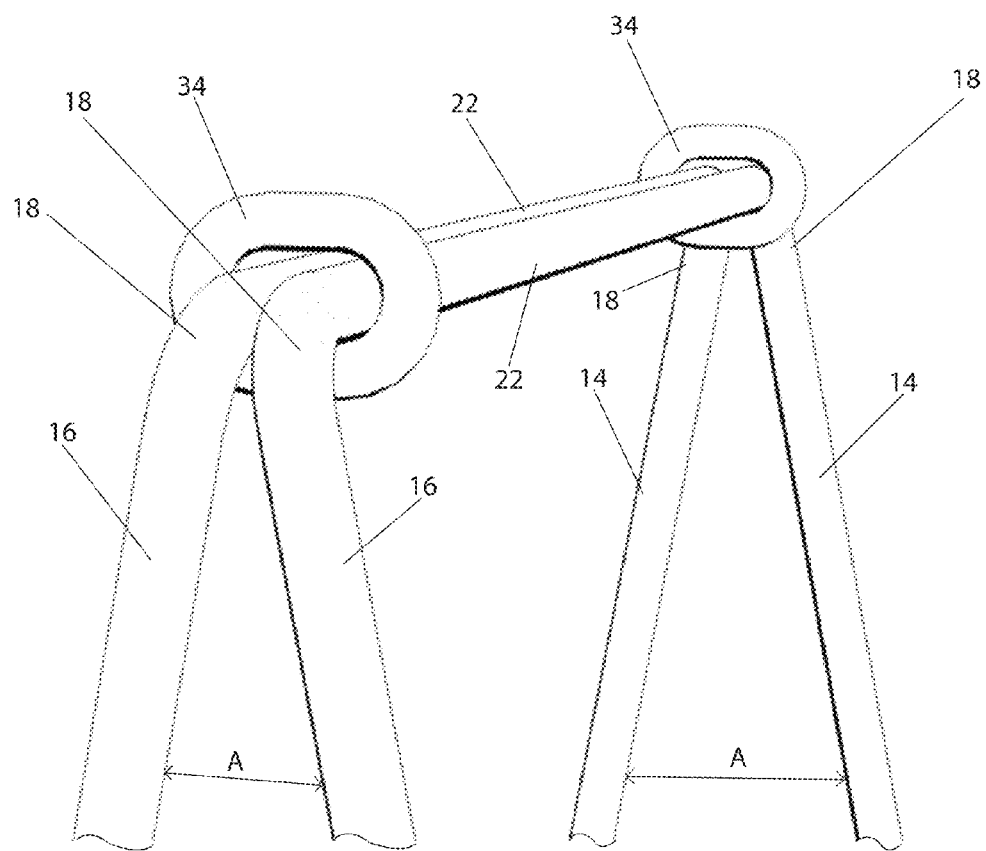
FIG. 5a is an enlarged perspective view of rings pivotably joining interconnected frame member portions of part of inverted block-U-shaped frame members of an enhanced-stability, A-frame-type plant support structure in accordance with the invention.
Figure 5B:
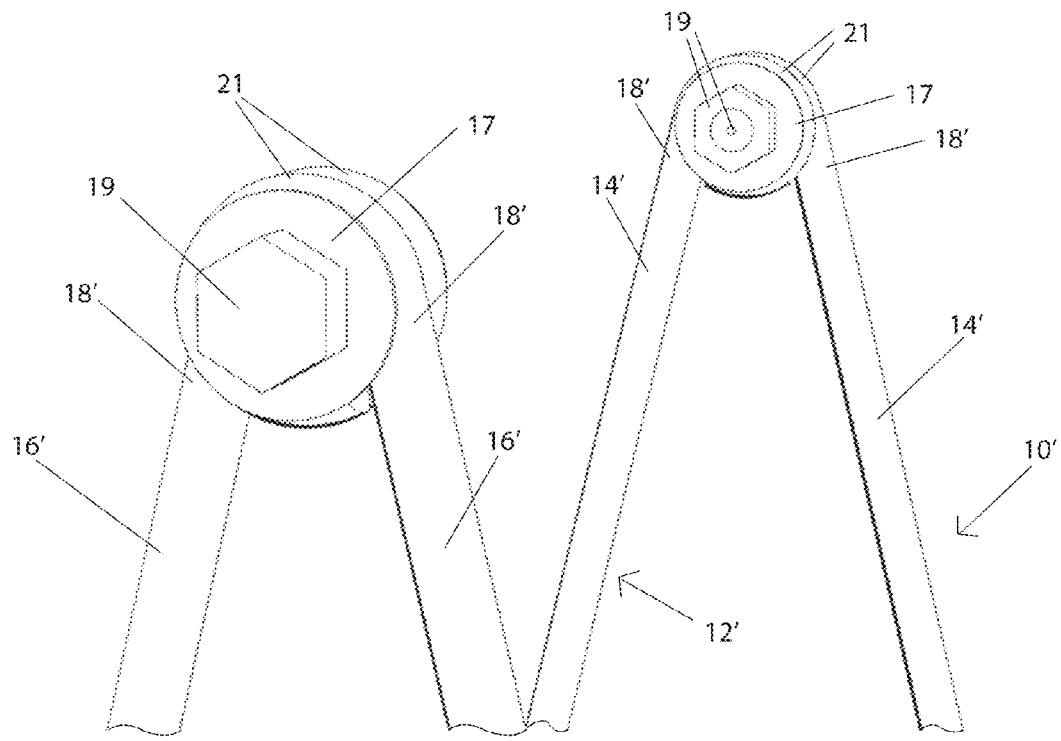
FIG. 5b is an enlarged perspective view of part of an alternative embodiment of the invention showing alternative means of pivotably interconnecting upper portions of ladder-like frame structures of the invention.
Figure 5C:
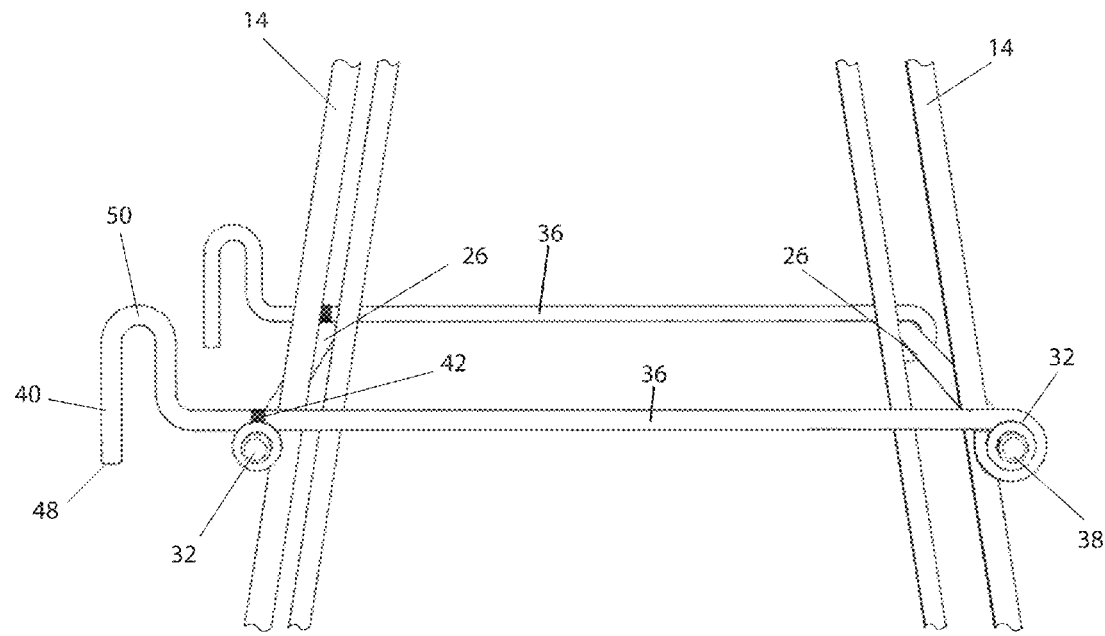
FIG. 5c is an enlarged perspective view of a partially extended latch mechanism of part of an enhanced-stability, A-frame-type plant support structure in accordance with the invention with the latch shown in a pre-installation optimum width alignment position.
Figure 5D:
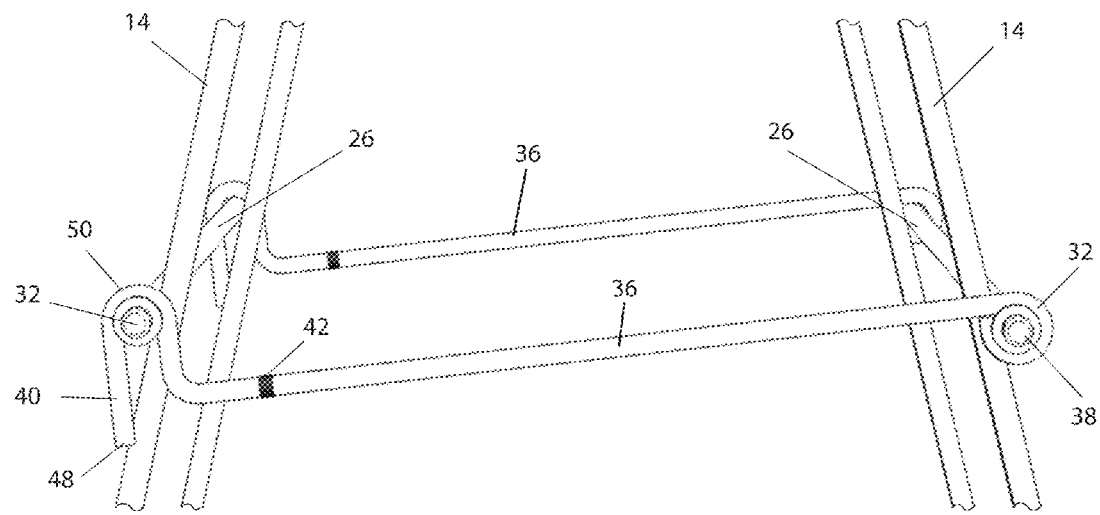
FIG. 5d is an enlarged perspective view of an engaged latch mechanism of part of an enhanced-stability, A-frame-type plant support structure in accordance with the invention.
Figure 6A:
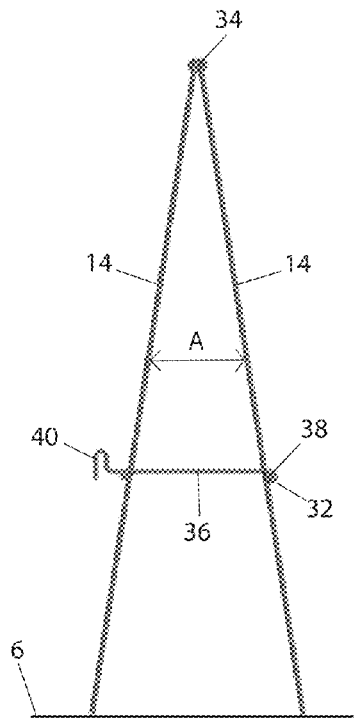
FIG. 6a is a side view of an enhanced-stability, A-frame-type plant support structure in accordance with the present invention and shown in a pre-installation position while sitting on the surface of the ground with a latch mechanism resting at a pre-installation position.
Figure 7A:
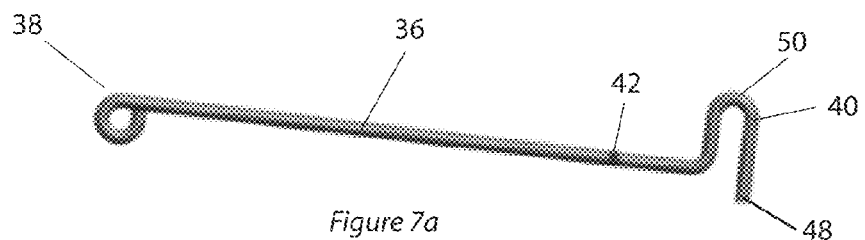
FIGS. 7a-e illustrate the primary embodiment and alternative embodiments of releasable detent and latch mechanisms suitable for use in accordance with the invention.

As shown in FIGS. 5c, 5d and 7a, there is an initial width guide measuring mark, score, notch or other similar means 42 for designating an optimum starting position along the shaft portion of latch 36. As shown at FIG. 5c and implied in FIG. 6a, mark 42 is shown aligned with axle 26 as latch 36 rests in slidable relationship with post 30 of axle 26 to indicate the ideal or optimum starting width position of the ends 20 of side support members 14, 16 of the structure 8 as the ends 20 rest upon the ground 6 at ground level. It will be appreciated by those of ordinary skill in the art that alignment of mark 42 with axle 26 is but one of several possible means to indicate an optimum starting width of the side support member legs 14, 16. Other means of indicating an optimum starting width, such as an initial angle indicator or spanning member, would serve the same function as alignment mark 42 on latch 36 aligned with axle 26, and are thus intended to be included as equivalents in the claims appended hereto.

Figure 6B:
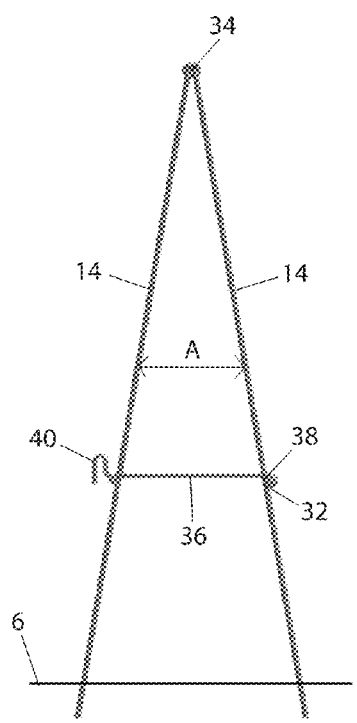
FIG. 6b is a side view of an enhanced-stability, A-frame-type plant support structure in accordance with the present invention and shown in a mid-installation position partially beneath the surface of the soil with a latch mechanism resting at an intermediate mid-installation position.
Figure 6C:
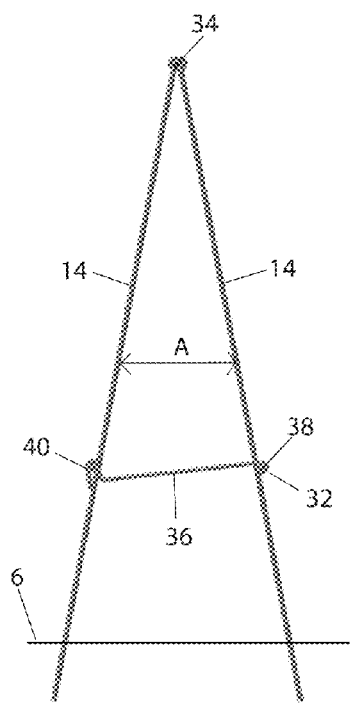
FIG. 6c is a side view of an enhanced-stability, A-frame-type plant support structure in accordance with the present invention and shown in a fully-installed position partially beneath the surface of the ground with a latch mechanism resting at a latched post-installation position.
Figure 6D:
FIG. 6d is a cross section view of a puncture cut pattern made by installation of an enhanced-stability, A-frame-type plant support structure installed in accordance with the present invention.
Figure 6E:
FIG. 6e is a cross section view of a slice cut pattern made by installation of a fixed type A-frame-type plant support structure installed in accordance with prior art.

As further illustrated in FIGS. 6a-c, as the structure 8 is pressed into the ground 6 by a user, the side support member legs 14, 16 expand relative to each other to widen angle A to become A' and A" upon full installation. As the angle A widens and the side support member legs 14, 16 move outwardly relative to each other, ends 20 of the side support members are caused to cut precise puncture path cuts into the ground as shown with ground cross section 6d as opposed to a ground slice 46 as illustrated in FIG. 6e if a prior art fixed version of an A-frame support structure were to be pressed into the ground.

Different alternative embodiments of the latch mechanisms 36 are shown in FIGS. 7a-e. In FIG. 7a there is shown the preferred embodiment of latch mechanism 36, since it allows for free sliding into place of the latch upon installation of the support structure 8 in the ground with the tip 48 preferably extending below the level of the shaft portion of latch 36 to assure stoppage of spreading of the side support members 14, 16 during installation at the correct width and depth of installation. Inverted U-shaped attachment mechanism 40 employs an exaggerated depth inverted U-shaped member 50 to ensure detent of the side support members 14, 16 in the desired location upon installation in the ground. The ensured detent of the side support members 14, 16, in either direction, outward and especially inward, lends enhanced stability to the A-frame-shaped support structure 8 in the ground, since the detent locks the side support members in a fixed angular relationship and such that upon installation of the structure, the precisely cut ground resulting from the installation is still relatively securely and snugly packed around the buried ends 20 of the side support members such that ground forces acting downwardly on the outwardly angled ends 20 resist pulling up forces placed on the structure 8 as during winds or bumping, etc. Thus, the detent attachment mechanism 40, including its inverted U-shaped portion 50, work together with the latch 36, posts 30, 28, block-U-shaped frame members 10, 12 and pivotable attachment means 34, or hog rings, to create a tensioned structure that is held firmly in and by the ground, including downward forces and friction forces, at ends 20 in a manner superior to prior art methods of anchoring plant support structures.

Upon completion of use of plant support structure 8, a user simply lifts latch 36 to disengage attachment mechanism 40 from post 30, allowing collapsibility of the support structure, and lifts the support structure out of the soil. As the user lifts the support structure 8 in this manner, the block-U-shaped frame members gradually collapse and allow travel of ends 20 of side support frame members 14, 16 within the punctured pathway 44 cut in the ground 6 during installation to avoid having to exert extra force to cut or slice the ground to remove the structure. This in turn facilitates easier removal of the structure 8 from the ground, especially if the ground has compacted and hardened around the ends 20 of the side support member legs 14, 16.

Figure 7B:
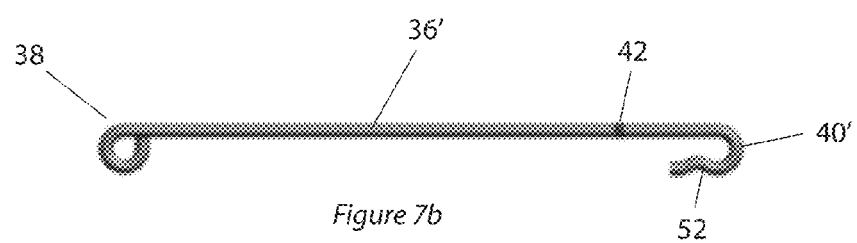

FIG. 7b shows a detent style snap hook type latch 36' employing a partial detent releasable attachment mechanism 40'. The attachment mechanism 40' includes a crooked portion 52 such that inside distance between the crooked portion and the shaft of the latch 36' is slidably smaller than the width of the post 30 of axle 26 upon which the detent mechanism engages during installation. With this alternative embodiment of the structure 8, the user aligns the width measurement mark 42 as with the preferred embodiment described above and begins to push the structure into the ground 6 so that the latch member 36' slides along post 30 until it reaches the crooked portion and snaps into place to signify completion of installation to the proper depth. The sliding to force fit of the crooked portion provides a measure of detent against bumping and wind forces that would otherwise upset and topple the structure 8.

Figure 7C:
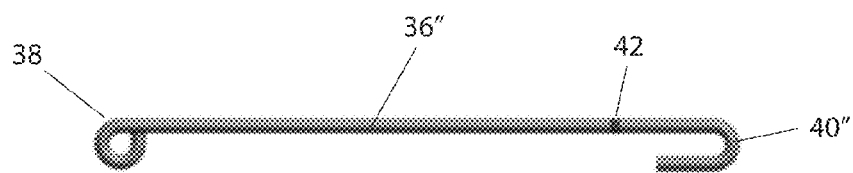

As shown in FIG. 7c, a less preferred embodiment of a latch 36" is shown which includes the width measurement mark 42 and outward expansion hook detent 40". While this embodiment enables easy installation as described above and which prevents slicing of the ground with a puncture type installation procedure, and thus this enhances the stability of the installed structure 8, it is less preferred because it does not provide a collapse detent feature as does the primary embodiment. Nevertheless, the expansion hook detent attachment mechanism 40" allows easy removal of the structure with the ends 20 of the side support members traveling the path of the installation puncture since collapse is readily allowed with this embodiment of the invention.

Figure 7D:
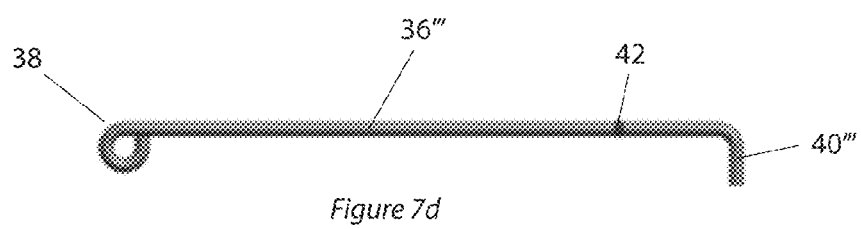

As shown in FIG. 7d, a less preferred embodiment of a latch 36''' is shown with essentially similar operating characteristics as those of latch 36". This embodiment of latch 36''' includes an eyelet 38 for pivoting attachment to post 28 of axle 26 to allow pivoting operation of the latch just like the other embodiments of the latch. Further, this embodiment of the latch includes a width guide measurement mark as well to facilitate easier installation of the structure 8 into the soil 6.

Figure 7E:
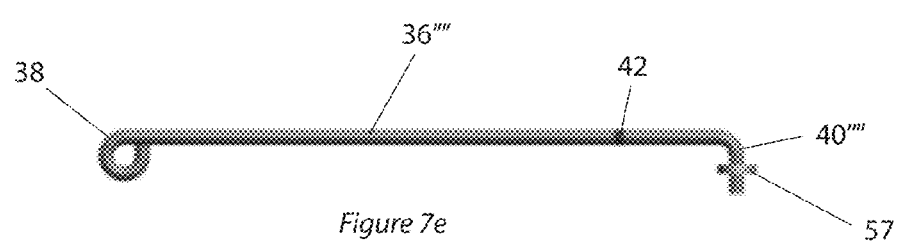

Finally, an alternative embodiment of a latch 36'''' having a horizontal eyelet and releasable detent attachment mechanism combination 40'''', 52 is shown in FIG. 7e which includes the same releasable lock characteristics as the latch 36 of the primary embodiment in that it is user operable to resist both angular expansion and contraction, or collapse, of the structure 8, thus enhancing stability of the structure upon installation as described above. However, this embodiment is also less preferred, as an additional step of lifting the latch 36'''' to place the detent 40'''' into horizontal eyelet 52 is required as the latch slides towards its extreme extent of travel at full installation of the structure 8.

Horizontal eyelet 52 is formed at end 30 of axle 26 in this embodiment and is adapted to receive attachment mechanism 40''''. This embodiment of latch 36'''' also includes an eyelet 38 for pivoting attachment to post 28 of axle 26 to allow pivoting operation of the latch just like the other embodiments of the latch. Further, this embodiment of the latch includes a width guide measurement mark as well to facilitate easier installation of the structure 8 into the soil 6 as described above.

It will be appreciated by those of ordinary skill in the art that any sidebar or latch combination performing the same or equivalent function as those latches specifically disclosed herein would not depart from the true scope and spirit of the invention.

Referring to FIGS. 1, 2, 4b and 8, there are disclosed a plurality of foot pegs 54. Each foot peg 54 comprises an L-shaped bracket that is bent preferably to a 90 degree angle at 55 and that is attached, preferably by welding bracket portion 53 to an inner edge of at least one of side support members 14, 16. Preferably there is at least one foot peg 54 attached to each side support member 14, 16, for a total of four foot pegs for the entire plant support structure. Also, preferably, each foot peg 54 is welded to a side support member 14, 16 at a location that is closer to the end 20 of each side support member than the attachment location of axle 26. In a preferred embodiment of the invention, the foot pegs 54 are spaced approximately 12 inches above end 20 of each side support member 14, 16. The foot pegs 54 are thus positioned so as to reside at ground level upon complete installation of the structure 8 into the ground. In this way, the foot pegs 54 provide additional stability for the support structure after it is installed, since the support structure is benefited by an effectively larger foot print on the surface of the ground provided by the foot pegs.

Figure 3:
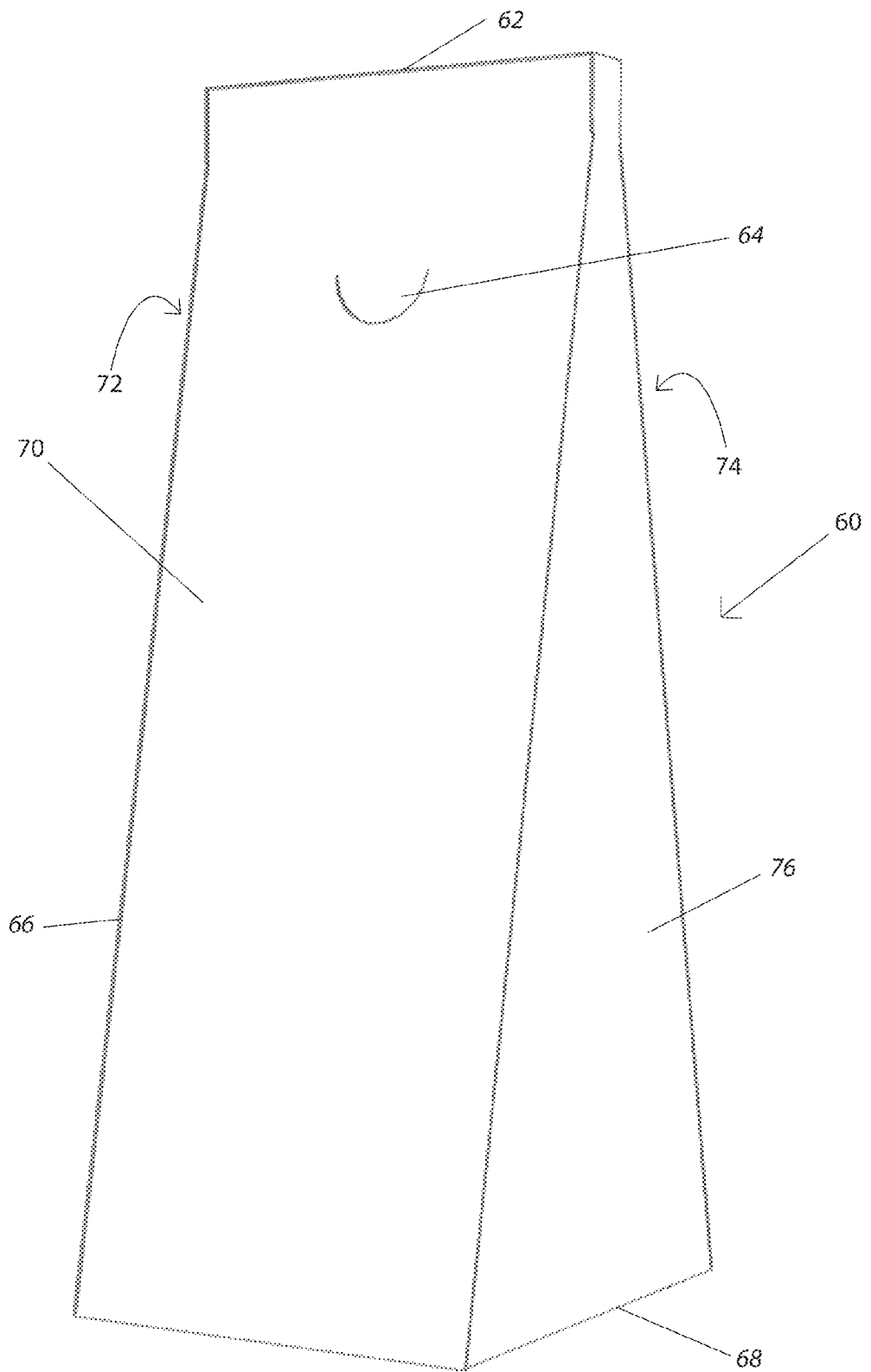
FIG. 3 is a perspective view of a removable cold-frame type greenhouse cover for an enhanced-stability, A-frame-shaped plant support structure.
Figure 4A:
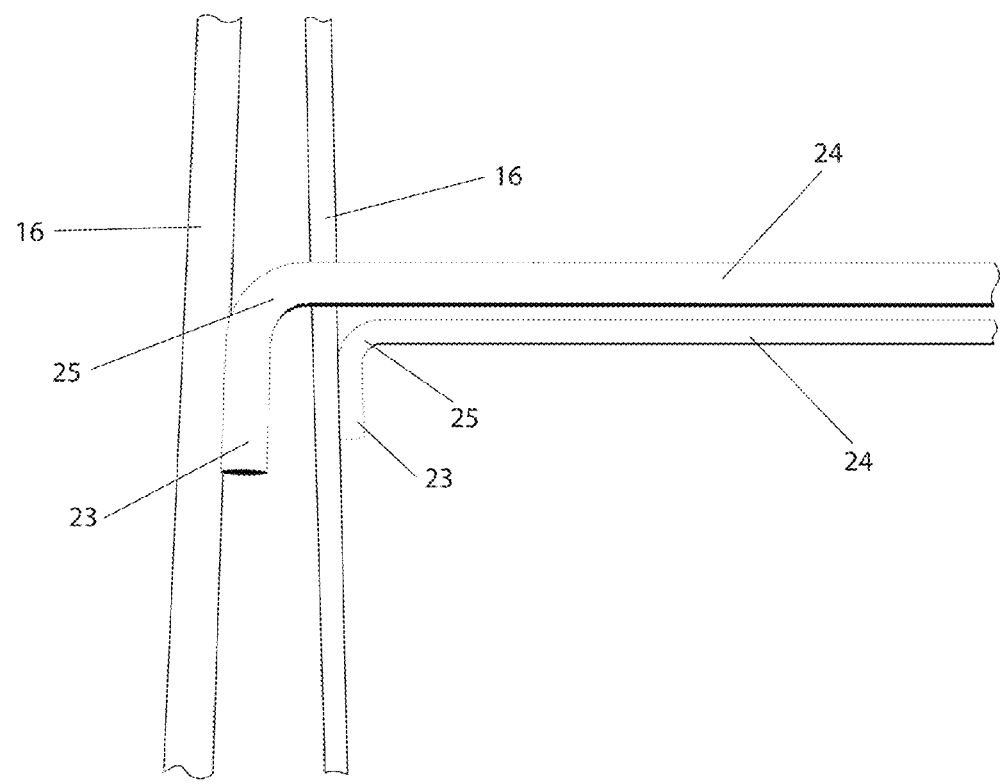
FIG. 4a is an enlarged perspective detail view of a welded attachment of part of two cross members to part of two corresponding side support members of an enhanced-stability, A-frame-type plant support structure in accordance with the invention.
Figure 4B:
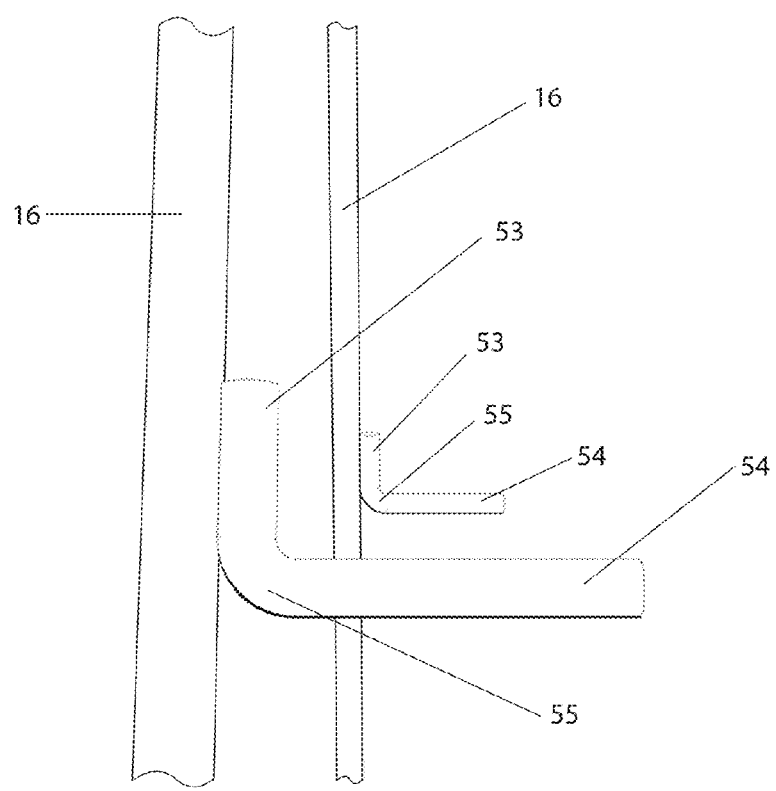
FIG. 4b is an enlarged perspective detail view of a welded attachment of part of two foot pegs to part of two corresponding side support members of an enhanced-stability, A-frame-type plant support structure in accordance with the invention.

As shown in FIGS. 2 and 3, a cold-frame, greenhouse-type protective cover 60 is in the form of an A-frame sleeve and is adapted for easy installation on support structure 8. The protective cover 60 is preferably made of a semi-opaque plastic material, such as 4 millimeter polyethylene. The protective cover 60 is preferably form fitted with heat sealed ends, and it may employ one or more seams 66, as with heat sealing or sewing, with such seams being provided along one or more of the meeting edges of the four main panels 70, 72, 74, 76. At least one flap/slit 64 is provided in an upper portion of the protective cover 60 to vent the cover as necessary during warmer weather. The protective cover 60 also comprises a lower edge 68 that may be reinforced with a beaded seam. Differing degrees of opacity, and different color tints may be employed in protective cover 60 as is known by those of ordinary skill in the art to account for different plant and climate types. A top portion 62 of protective cover 60 may be reinforced with added layers of plastic or other reinforcing material to prevent tearing or undue wear of that part of the protective cover which rests upon the upper, horizontal interconnecting members 22 of the support structure 8.

The protective cover 60 is made in a form that will rest upon and fit snuggly on the A-frame shaped support structure 8, with seams 66 of the protective cover laying in resting relationship closely adjacent and on side frame support members 14, 16 to prevent undue stress on the cover at the top of the cover. On the installed support structure 8, the protective cover 60 will extend at lower edge 68 to about an inch off the ground 6, which is also about an inch above foot pegs 54. The support structure 8 facilitates easy installation of the protective cover 60 to this appropriate height above the ground, since in particular the width guide indicator marks 42 and detent latch mechanisms 36 guide the user in consistently installing the support structure to a consistent angle A between block-U-shaped members 10, 12 and the appropriate depth in the soil 6 for the greatest stability, ease of installation, ease of removal, and hence, ease of consistent application of the protective cover. As the user is guided in installing the support structure 8 to a consistent depth, consistent application of the protective cover 60 to allow the standard height of bottom edge 68 of the protective cover from the ground is assured, which in turn helps ensure successful protection of the plant against cold weather.

While a preferred distance of lower edge 68 from the ground 6 is disclosed, it will be appreciated by those of ordinary skill in the art that varied distances from the ground would be desirable for different plant and weather types. Those of ordinary skill in the art will appreciate that this fact may be accounted for with varied or multiple width gauge measurement marks 42 accounting for different weather conditions, or alternatively, lower edge 68 may be folded or rolled up to allow more distance between the protective cover 60 and the ground 6.

Preferably the block-U-shaped support members 10, 12 are made of powder coated ¼ inch diameter metal wire, and the cross members may be constructed of a slightly smaller gauge rod, such as 3/16 inch diameter metal wire. The welds of the device are preferably made with a MIG wire welding process that affords a sturdier weld that a spot welding machine. Nevertheless, any number of metal or plastic materials known in the art and possessing properties suitable for the purposes and functions of the invention may be employed without departing from the true scope and spirit of the invention.

While a preferred embodiment and several alternative embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An enhanced-stability, A-frame-shaped plant support that folds flat for storage when not in use and that is suitable for use in a garden or farm for the support of plants growing in soil, the plant support comprising:

first and second inverted block-U-shaped frame members, each said block-U-shaped frame member comprising at least first and second side support frame members having first and second ends and an upper interconnecting frame member interconnecting said side support frame members at said first end of each said side support frame member;

a plurality of cross members, each said cross member interconnecting said side support frame members of each said block-U-shaped frame member at a plurality of locations along each said side support frame member in substantially parallel fashion relative to said interconnecting horizontal frame member, and wherein the cross member that is closest to said second ends of each said side support frame member is sufficiently distant from said second ends of said side support frame members to allow for puncture placement of said second ends of said side support frame members in the soil upon installation;

means for pivotably joining said interconnecting frame members of each said block-U-shaped frame member to enable hinge-like movement of said block-U-shaped frame members relative to each other;

a first post rigidly attached on said first side support frame member of said first block-U-shaped frame member and a second post rigidly attached on said first side support frame member of said second block-U-shaped frame member;

a latch comprising an eyelet on one end being pivotably connected to said first post, said latch further comprising a hook on an end opposite said eyelet, said latch being adapted for user operation during installation of the plant support in the soil to enable sliding of said latch along said second post to releasably interconnect said hook with said second post, said latch adapted to stabilize the plant support in an installed punctured position in the soil; and a starting width indicator mark located at an intermediate position on said latch, said indicator mark adapted for alignment, but not fastened with said second post to indicate an optimum degree of initial partial opening of said block-U-shaped frame members with the plant support resting on top of the soil prior to installation adapted to facilitate optimum depth puncture placement of the plant support upon being pushed downwardly into the soil as said latch slides along said second post from said intermediate position to an expanded position.

2. The enhanced-stability, A-frame-shaped plant support of claim 1, wherein said means for pivotably joining said interconnecting frame members comprises a plurality of rings, each ring comprising an appropriately-sized inside diameter to hold said interconnecting frame members closely adjacent each other but also allowing pivoting movement of said interconnecting frame members relative to each other, wherein said hook comprises an inverted, substantially U-shaped hook adapted for automatically and rigidly interconnecting said latch and said second post to preclude further opening of said block-U-shaped frame members upon reaching a final extent of sliding travel of said latch on said second post and additionally adapted for stabilizing said plant support by retaining flex in said block-U-shaped frame members imparted by a user in a first installed position together with said rings and said second ends of said side support members adapted for puncture placement installation in the soil, said hook being further user operable to a second position disengaged from said second post adapted to facilitate removal and collapse the plant support from the soil without having to cut through the soil.

3. The enhanced-stability, A-frame-shaped plant support of claim 1, further comprising a third post rigidly attached on said second side support frame member of said first block-U-shaped frame member and a fourth post rigidly attached on said second side support frame member of said second block-U-shaped frame member, said plant support further comprising another latch, said another latch further comprising another eyelet on one end and being pivotably connected to said third post, said another latch further comprising another hook on an end opposite said another eyelet, said another latch also being adapted for user operation during installation of the plant support in the soil to enable sliding of said another latch along said fourth post to releasably interconnect said another hook on said another latch with said fourth post, said latches and U-shaped frame members being adapted for stabilizing the plant support in an installed punctured position in the soil.

4. The enhanced-stability, A-frame-shaped plant support of claim 3, further comprising a plurality of foot pegs, one said foot peg being attached to each said side support member.

5. The enhanced-stability, A-frame-shaped plant support of claim 1, wherein said block-U-shaped frame members are made of metal rods, wherein said cross members are made of metal rods, and wherein said eyelet of said latch is pivotably retained on said first post by an axle hat and said hook is releasably retained on said second post by an axle hat.

6. The enhanced-stability, A-frame-shaped plant support of claim 1, further comprising a removable A-frame-shaped protective cover adapted for protecting plants against colder weather conditions.

7. The enhanced-stability, A-frame-shaped plant support of claim 6, wherein said removable A-frame-shaped protective cover is dimensioned so as to be readily applicable to the plant support and adapted to facilitate a consistent air gap between the protective cover and the soil when applied to successive installations of the plant support, or multiple such plant supports, because said starting width indicator mark enables consistent depth and angle of installation of said second ends of said side support members in the soil.

8. An enhanced-stability, A-frame-shaped plant support that folds flat for storage when not in use and that is suitable for use in a garden or farm for the support of plants growing in soil, the plant support comprising:

first and second inverted block-U-shaped metal rod frame members, each said block-U-shaped frame member comprising at least first and second side support frame members having first and second ends and an upper interconnecting frame member interconnecting said side support frame members at said first end of each said side support frame member;

a plurality of metal rod cross members, each said cross member interconnecting said side support frame members of each said block-U-shaped frame member at a plurality of locations along each said side support frame member in substantially parallel fashion relative to said interconnecting horizontal frame member, and wherein the cross member that is closest to said second ends of each said side support frame member is sufficiently distant from said second ends of said side support frame members to allow for puncture placement of said second ends of said side support frame members in the soil upon installation of the plant support structure and wherein said cross members interconnected closest to said second ends of said side support members each comprise an axle member attached to said side support members, said axle members providing first and second rigid posts, said first post being attached to said first side support member of said first block-U-shaped frame member, said second post being attached to said first side support member of said second block-U-shaped frame member;

a plurality of rings, each said ring having an appropriate-sized inside diameter to hold said interconnecting frame members of said block-U-shaped frame members closely adjacent each other while also allowing for pivotably joining said interconnecting frame members of each said block-U-shaped frame member to enable hinge-like movement of said block-U-shaped frame members relative to each other;

at least one latch having first and second ends, said first end of said latch having an eyelet thereon and said second end of said latch having an inverted, substantially U-shaped hook thereon, said eyelet being pivotably connected to said first post;

a starting width indicator mark located at an intermediate position on said latch, said indicator mark adapted for being aligned, but not fastened with said second post at an initial intermediate open position of said plant support with said latch resting upon said second post while the plant support rests prior to installation on top of the soil, and wherein said indicator mark is calibrated to facilitate an optimum depth of puncture placement travel of said second ends of said block-U-shaped frame members into the soil during installation of the plant support, said latch adapted for sliding engagement along said second post during installation when a user pushes the second ends of the plant support into the soil until said substantially U-shaped hook automatically and releasably interconnects with said second post at the final extent of travel of said latch along said second post, the final extent of travel of said latch from the intermediate open position of the plant support and along said second post where said U-shaped hook is interconnected with said second post corresponding to an optimum predetermined depth of puncture of said second ends of said side support members into the soil, said latch being adapted for retaining flex in said block-U-shaped frame members upon installation and for enhanced stabilization of the plant support, said starting width indicator mark, said latch and said block-U-shaped frame members being adapted for working together upon pushing by a user of said second ends of said side support members into the soil for puncturing to cut a minimal path through the soil to facilitate a stabilized installation, and said substantially U-shaped hook being further adapted for user operation to remove said hook from said second post in a second position to facilitate collapse of the plant support while it is removed from the soil.

9. The enhanced-stability, A-frame-shaped plant support of claim 8, further comprising a removable A-frame-shaped protective cover for protecting plants against colder weather conditions.

* * * * *